United States Patent [19]

Diefenbacher et al.

[11] 3,957,615

[45] May 18, 1976

[54] APPARATUS FOR CONDUCTING ELECTROLYTIC REACTIONS

[75] Inventors: Walter Diefenbacher, Blankenloch; Peter Schlosser, Au am Rhein; Eduard Schwind, Karlsruhe, all of Germany

[73] Assignee: Gesellschaft fur Kernforschung m.b.H., Karlsruhe, Germany

[22] Filed: Dec. 28, 1973

[21] Appl. No.: 429,640

[30] Foreign Application Priority Data

Dec. 28, 1972 Germany.............................. 2263782

[52] U.S. Cl................................. 204/260; 204/1.5; 204/261; 204/263
[51] Int. Cl.²......................................... C22D 1/02
[58] Field of Search ............ 204/1.5, 260, 261, 263, 204/272

[56] References Cited
UNITED STATES PATENTS

| | | | |
|---|---|---|---|
| 1,982,224 | 11/1934 | Michel | 204/260 |
| 2,361,974 | 11/1944 | Smith | 204/260 |
| 3,616,276 | 10/1971 | Schneider et al. | 204/1.5 |
| 3,770,612 | 11/1973 | Gray et al. | 204/261 |

Primary Examiner—G. L. Kaplan
Assistant Examiner—A. C. Prescott
Attorney, Agent, or Firm—Spencer & Kaye

[57] ABSTRACT

An electrolytic cell includes a vessel defining an electrolysis chamber and a cover for the vessel. A tubular diaphragm divides the vessel into a cathode chamber extending inwardly from the diaphragm and an anode chamber extending outwardly from the diaphragm. A tubular anode is positioned in the anode chamber and a cathode is positioned in the cathode chamber. The cathode comprises a plurality of angularly spaced sheets positioned about a center axis which is common to the anode and diaphragm.

15 Claims, 2 Drawing Figures

3,957,615

APPARATUS FOR CONDUCTING ELECTROLYTIC REACTIONS

BACKGROUND OF THE INVENTION

The present invention relates to an apparatus for conducting electrolytic reactions in an aqueous phase and more particularly for reducing plutonium and/or uranium contained in an aqueous phase by means of electrolysis, the reduction taking place between electrodes connected to a current source.

During reprocessing of nuclear fuels there develops, among other things, a nitric acid solution of plutonium and uranium. Generally, it is desirable to concentrate or enrich this solution and separate the plutonium in it from the uranium. Thus, the nitric acid-plutonium-uranium solution is initially concentrated to a small volume for reasons of economy and in this concentrated solution the plutonium is electrolytically reduced to plutonium (III) and then separated by precipitation as plutonium (III) oxalate. The precipitation and electrolysis should be conducted in a concentration of free nitric acid which is as high as possible. Small quantities of residual uranium, however, are tolerable.

It is known to electrolytically reduce plutonium (IV) — uranium (VI) solution in 1 molar nitric acid (British Patent No. 1,096,592). The prior art, however, has not taught that a plutonium (IV)/(III) reduction can be successfully accomplished in strong nitric acid. Moreover, persons skilled in the art doubt that plutonium (III) is stable in strong nitric acid. Thus, $3mHNO_3$ has been considered to be the upper tolerance limit for the stability of plutonium (III) in an aqueous solution from which the plutonium is to be precipitated.

Accordingly, it is a primary object of the present invention to develop an apparatus which is suitable for commercial operation and which permits a quantitative plutonium (IV)/(III) reduction to be effected continuously in a single stage. As used in this specification and claims, the term "in a single stage" indicates that the plutonium (IV)/(III) reduction is quantitative in a single electrolysis cell (stage). It is another object of this invention to provide an apparatus and method wherein the plutonium (III) in the reduced solution is stable to permit its separation by precipitation from the aqueous solution. A further object of this invention is to provide an electrolysis cell having a reduction electrode that has a large area, but which is not oversized and can be conveniently used in normal application.

SUMMARY OF THE INVENTION

The present invention provides an apparatus for conducting electrolysis reactions in an aqueous solution between anode and cathode electrodes connected to a current source. In accordance with the invention, the apparatus comprises: a vessel defining an electrolysis chamber; a cover for the vessel; a tubular diaphragm dividing the vessel into a cathode chamber extending inwardly from said diaphragm and an anode chamber extending outwardly from said diaphragm; a tubular anode positioned in the anode chamber; and a cathode positioned in said cathode chamber, the cathode comprising a plurality of angularly spaced sheets positioned about a center axis which is common to the anode and the diaphragm.

Preferably, the apparatus includes a stirrer for mixing and evenly distributing electrolyte in the cathode chamber. The stirrer preferably includes a rotatable shaft mounted in the vessel cover and a plurality of blades connected to the shaft and rotatably movable in the cathode chamber.

The cathode chamber preferably includes an overflow for the electrolyte. Desirably, the anode comprises a platinum-plated and perforated cylindrical tube of titanium sheet metal, the diaphragm is made of clay, and the cathode is made of titanium sheet metal.

The apparatus of the present invention is especially useful for electrolytically reducing plutonium and/or uranium contained in an aqueous solution. In one aspect of the present invention a method is provided for electrolytically reducing plutonium and/or uranium in the apparatus of the present invention by adding a mixture of 3.3 m/l hydrazine and 1.5 m/l free nitric acid as a stabilizer to the aqueous phase containing plutonium and uranium.

DESCRIPTION OF THE PREFERRED EMBODIMENTS

Figure 1:
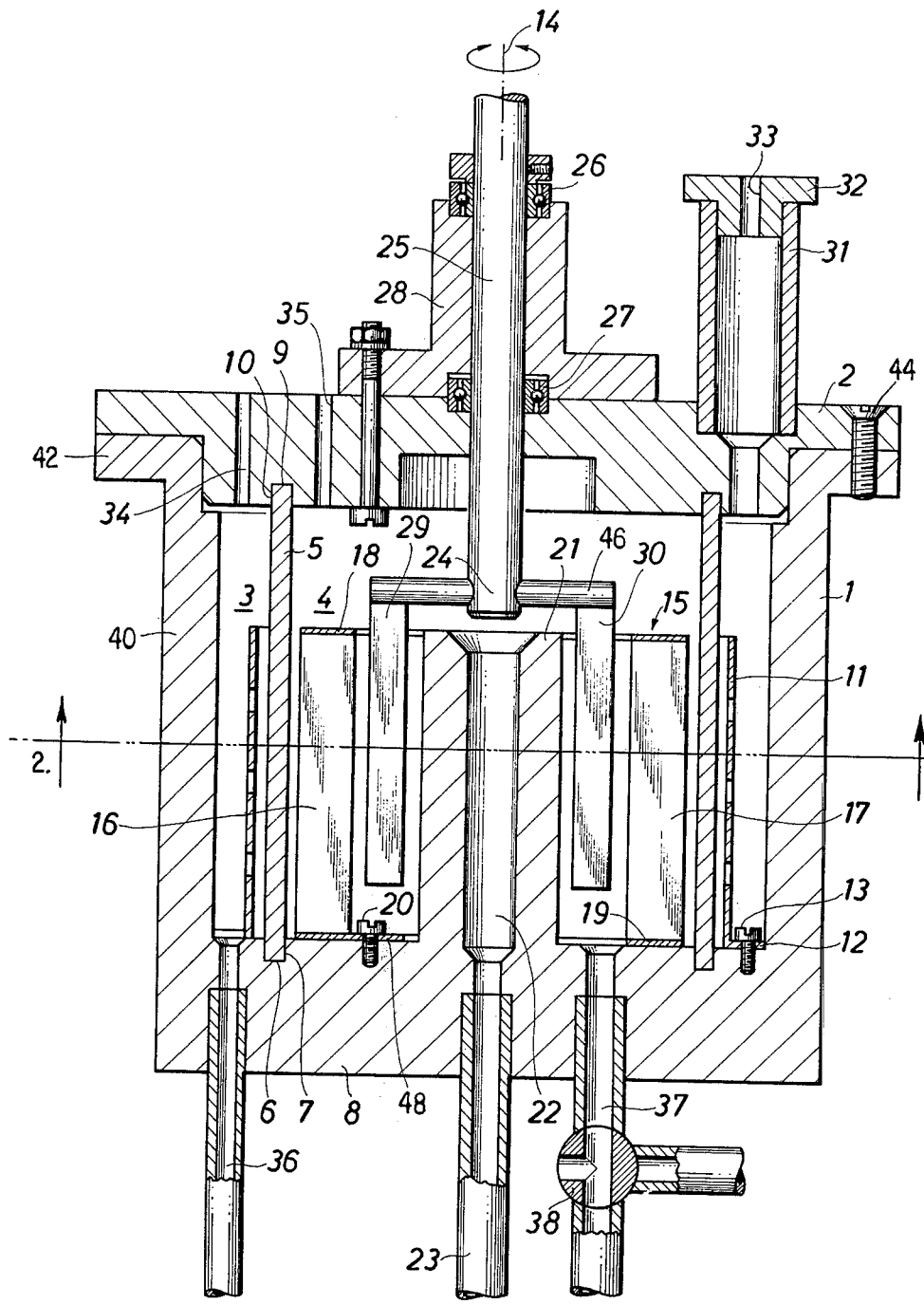
FIG. 1 is A vertical sectional view of an apparatus constructed in accordance with the teachings of the present invention.

A preferred embodiment of the invention will now be described in greater detail with reference to the attached drawings.

The apparatus of the present invention, as seen in the drawings, includes a vessel 1 in which electrolysis occurs and a cover 2 for the vessel. Vessel 1 and cover 2 are preferably made of an acid resistant plastic. Vessel 1 is cylindrical in shape and includes a cylindrical outside wall 40 and a bottom wall 8. Vessel 1 is open at its top and a lip 42 extends outwardly from cylindrical wall 40. Cover 2 rests on lip 42 and is detachably secured to the lip by a plurality of set screws 44, only one of which is shown in the drawing.

A cylindrical diaphragm 5 divides vessel 1 into a cathode cell chamber 4 which extends radially inwardly from the diaphragm and an anode cell chamber 3 which extends outwardly from the diaphragm. Anode chamber 3 is annular in shape and is defined by the diaphragm 5 and the outside wall 40 of the vessel. Diaphragm 5 has a lower end face 6 which is inserted in a groove 7 in bottom wall 8 of vessel 1 and is fastened thereto. Diaphragm 5 also has an upper end face 9 which engages in a groove 10 in cover 2 when the cover 2 is placed on vessel 1.

In accordance with the invention, an anode 11 is positioned in the outer anode chamber 3. Anode 11 comprises a perforated cylinder of 1 mm titanium sheet metal which is covered on both sides with $2.5\mu$ of platinum. Anode 11 is fastened to bottom wall 8 of vessel 1 by means of an outwardly extending flange 12 integrally formed at the bottom of the anode and titanium screws 13 which pass through flange 12 and into bottom wall 8. Anode 11 preferably is provided with three horizontal rows of holes of 3 mm diameter, each row having 12 holes and each row being spaced from the other by 14 mm. Anode 11 does not extend in its height over the entire interior height of the cell chambers 3 and 4. Anode 11 is concentrically arranged about a center axis 14 of vessel 1 as is diaphragm 5 and a cathode, generally 15, described in greater detail below.

Figure 2:
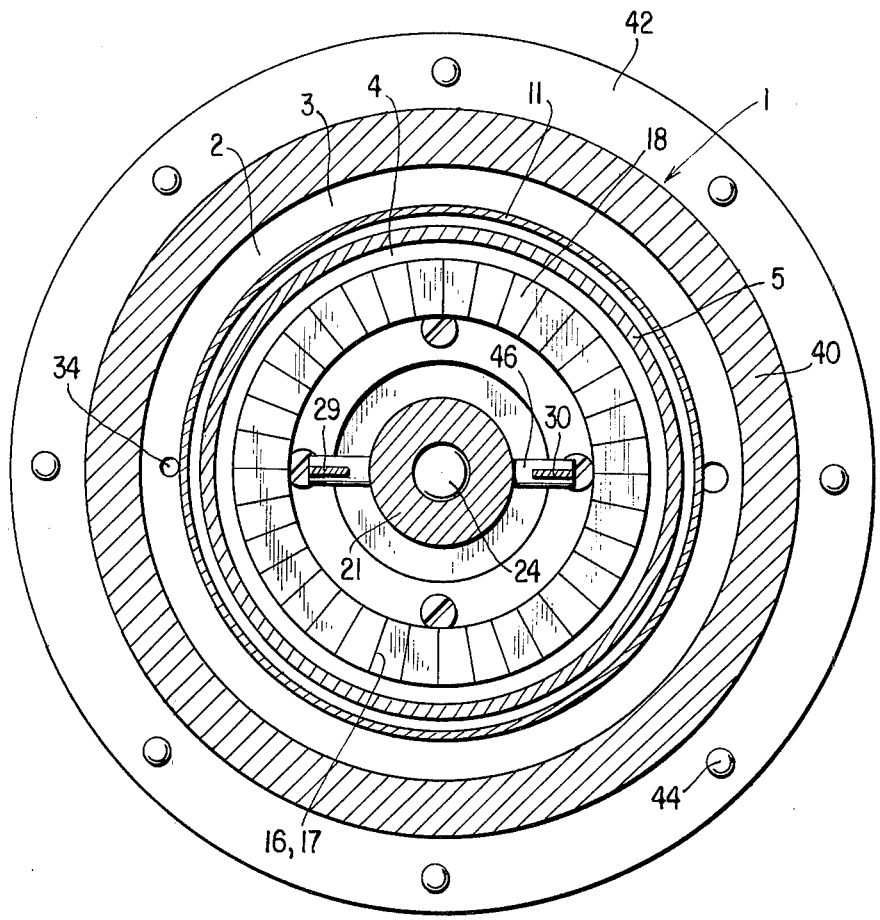
FIG. 2 is a horizontal sectional view taken along line 2—2 of FIG. 1.

Cathode 15 comprises a plurality of individual sheets or plates which are parallel to the longitudinal center axis 14 of vessel 1 and angularly spaced from each other about center axis 14. Two such sheets 16 and 17 are shown in FIG. 1 of the drawing but, as will be understood by those skilled in the art, additional cathode sheets are spaced about center axis 14, as shown in FIG. 2.

Each cathod sheet, such as sheets 16 and 17, preferably is planar, rectangular in shape, and has an upper edge, a lower edge, an outer edge spaced a short distance from diaphragm 5, and an inner edge that is spaced from center axis 14 so that the cathode has an open cylindrical interior defined by the inner edges of its individual sheets. The individual sheets of the cathode are connected to each other by an upper end plate 18 in the form of a ring which is attached, as by welding under a protective gas, to the upper edges of each sheet. The individual sheets of the cathode are also connected to each other by a bottom end plate 19 in the form of a ring which is attached, as by welding under a protective gas, to the lower edges of each sheet. Bottom end plate 19 is secured to bottom wall 8 by means of titanium screws 20 (only one of which is shown) that are threaded into a section 48 of the bottom plate that extends inwardly past the inner edges of the cathode sheets. Cathode 15 preferably is thus in the shape of a mill wheel, or fan-shaped. The height of cathode 15 preferably corresponds to and is the same as the height of anode 11. Cathode 15 preferably is made of 1 mm titanium sheet metal.

The inner edges of the individual sheets of the cathode preferably are equally spaced from each other and lie on a circle having a radius passing through center axis 14. Similarly, the outer edges of the individual sheets of the cathode preferably are equally spaced from each other and lie on a circle having a radius passing through center axis 14. As shown in FIG. 2, the sheets of the cathode extend in a radial direction. Especially there are 36 radial-sheets (10°-distance) of a length of 55 mm, a width of 10 mm and a thickness of 0.5 mm.

In a preferred embodiment of the invention, an axial overflow is provided to keep the electrolyte level constant. The overflow comprises a stem 21 extending upwardly into cathode chamber 4 from bottom wall 8 and having an internal bore 22 which communicates with a discharge opening, in the form of an outlet tube 23, in bottom wall 8. Stem 21 passes through center axis 14 and is spaced inwardly from the inner edges of the individual sheets of cathode 15 and forms an annular space therewith.

In a preferred embodiment of the invention, a stirrer 24 is provided to mix and evenly distribute the electrolyte in the cathode chamber 4. Stirrer 24 is double bladed, made of titanium and includes a rotatably mounted shaft 25. Shaft 25 is rotatably mounted by a stainless ball bearing 27 secured to the top face of cover 2 and a stainless steel ball bearing 26 secured to a sleeve 28 which is attached to and extends upwardly from cover 1. Stirrer 24 includes two axially extending spaced apart blades 29 and 30 which are connected to shaft 25 by a rod 46. Blades 29 and 30 are positioned in the space between stem 21 and cathode 15 and rotate in this space when shaft 25 is rotated to effect stirring of the electrolyte. As will be understood by those skilled in the art, shaft 25 can be rotated by any conventional means, such as by a motor connected to the shaft by suitable gearing.

Anolyte can be filled into anode chamber 3 through a tube 31 fastened to cell cover 2. A cap 32 closes the top of tube 31. During electrolysis, tube 31 permits outflow of anodic oxygen through an outlet opening 33 which can be provided in cap 32 for this purpose.

Cover 2 contains bores 34 and 35 which are provided for electrical leads (not shown) to the electrodes 11 and 15. These leads (platinum wire to anode 11 and titanium wire to cathode 15) are conductively connected by means of bottom screws 13 and 20. Anode chamber 3 can be emptied by means of a two-way valve (not shown) through an outlet, in the form of a tube 36, in bottom wall 8. Cathode chamber 4 is emptied through an outlet, in the form of a tube 37, in bottom wall 8 via a three-way valve 38. Valve 38 also permits electrolyte to be continuously fed into the electrolytic cell.

In operation, it has been found that the electrolytic plutonium (IV)/(III) reduction at titanium cathode 15 according to the present invention becomes complete in 5 molar to 7.5 molar nitric acid in the presence of 0.2 molar hydrazine, and takes place even in 10 molar nitric acid.

From oxidation-reduction potentials it can be established that it is possible to provide a complete and selective electrolytic plutonium reduction in the presence of uranium. To accomplish this, the cathode potential to be applied must be more negative than the plutonium (IV)/(III) redox potential of +0.982 volt and more positive than the uranium (VI)/(IV) redox potential of 0.334 volt. Under certain conditions, which must be maintained constant, it is possible to achieve a solution which contains only plutonium (III) and uranium (VI). Among these conditions that must be controlled are the cathode potential, the electrolyte concentration, the amount of electrolyte fed in per unit time, the movement of the eletrolyte as well as the temperature in the electrolysis cell. These conditions themselves depend on the fluctuations of the main voltage, the temperature of the ambient air and a possible precooling of the electrolyte.

Stability of the plutonium (III) solution can also be achieved by providing uranium (IV) in the solution. Uranium (IV) is obtained by using a cathode potential which permits a uranium (VI)/(IV) reduction to occur in addition to the plutonium (IV)/(III) reduction. The use of such a cathode potential has the further advantage that the primary plutonium (IV)/(III) reduction is accelerated by the uranium (IV) produced simultaneously in a secondary reaction and becomes quantitative in a finite time. The electrolysis is controlled by the application of an optimum voltage so that the reduced electrolyte contains some uranium (IV) in addition to plutonium (III) and uranium (VI). In a specific reduction of a Pu(IV)/U(VI) solution with the objective of obtaining Pu(III) the following process parameters were used:

The feed were 2.5 l/h of a solution consisting of 4g/l Pu(IV), 191 g/l U(VI), 6.6 M/l HNO$_3$, and 0.1 M/l N$_2$H$_4$. The voltage applied and, hence, the current were varied stepwise, kept constant over time intervals, and the amount of Pu(III) and U(IV) in g/l was analysed in the cell outlet. For the time intervals 0–12, 12–22, 22–32, 32–42, and 42–50 min. and the respective voltages applied of 2.52, 2.64, 2.70, 2.44, 2.40 (Volt) and currents, respectively, of 3.12, 4.14, 4.44, 2.95, 2.70

(Ampere) the values determined were 4.0 g/l Pu(III) and 3.6, 4.4, 4.9, 3.8, and 2.9 g/l U(IV), respectively. The temperature was 24.5°C.

It will be understood that the above description of the present invention is susceptible to various modifications, changes and adaptations, and the same are intended to be comprehended within the meaning and range of equivalents of the appended claims.

We claim:

1. Apparatus for conducting electrolytic reactions in an aqueous solution comprising:
   a. a vessel defining an electrolysis chamber and including a bottom wall;
   b. a cover for the vessel;
   c. a tubular diaphragm dividing the vessel into a cathode chamber extending inwardly from the diaphragm and an anode chamber extending outwardly from the diaphragm;
   d. a tubular anode positioned in the anode chamber;
   e. a cathode positioned in the cathode chamber, said cathode comprising a plurality of angularly spaced sheets positioned about a center axis common to the anode and diaphragm; and
   f. an overflow in the cathode chamber for the aqueous solution, said overflow comprising a stem extending upwardly from the bottom wall and having an internal bore which communicates with a discharge opening in the bottom wall.

2. The apparatus according to claim 1 wherein the cathode is in the shape of a mill wheel.

3. The apparatus according claim 1 wherein said cathode has an open interior and a bladed stirrer is mounted in said cover, the blades of said stirrer being rotatably movable in the interior of the cathode.

4. The apparatus according to claim 1 wherein the diaphragm includes an upper end face which is received in a groove in the cover.

5. The apparatus according to claim 1 wherein the cathode includes an end plate and the sheets of the cathode are fastened to the end plate at their lower edges.

6. The apparatus according to claim 5 wherein the end plate is secured to the bottom wall.

7. The apparatus according to claim 5 wherein the cathode includes a second end plate, and the sheets of the cathode are fastened to the second end plate at their upper edges.

8. The apparatus according to claim 1 wherein the anode, the lower end face of the diaphragm and the cathode are secured to the bottom wall of the vessel.

9. The apparatus according to claim 1 wherein the cover contains an inlet for the anolyte and the bottom wall contains an outlet for the anolyte.

10. The apparatus according to claim 9 including an opening in the bottom wall of the vessel which communicates with the cathode chamber and serves as an inlet and outlet for catholyte.

11. The apparatus according to claim 1 wherein the anode is made of a platinum-plated and perforated cylinder of titanium sheet metal, the diaphragm is made of clay and the cathode is made of titanium sheet metal.

12. The apparatus according to claim 1 wherein the cathode includes an end plate and the sheets of the cathode are secured to the end plate at their lower edges.

13. The apparatus according to claim 1 wherein the sheets of the cathode extend in a radial direction.

14. The apparatus according to claim 13 wherein the sheets of the cathode are equally spaced from each other.

15. Apparatus for conducting electrolytic reactions in an aqueous solution comprising:
   a. a vessel defining an electrolysis chamber and including a bottom wall;
   b. a cover for the vessel;
   c. a tubular diaphragm dividing the vessel into a cathode chamber extending inwardly from the diaphragm and an anode chamber extending outwardly from the diaphragm;
   d. a tubular anode positioned in the anode chamber;
   e. a cathode positioned in the cathode chamber, said cathod comprising a plurality of angularly spaced sheets positioned about a center axis common to the anode and diaphragm;
   f. the cover containing an inlet for the anolyte and the bottom wall containing an outlet for the anolyte;
   g. the bottom wall further including an opening which communicates with the cathode chamber and serves as an inlet and outlet for catholyte; and
   h. a valve provided at said outlet for the catholyte to provide for the continuous feeding of electrolyte into the vessel.

* * * * *